(12) United States Patent
Harris

(10) Patent No.: US 7,497,653 B2
(45) Date of Patent: Mar. 3, 2009

(54) LOCKING FASTENER ASSEMBLY

(75) Inventor: David Harris, Fulton, IL (US)

(73) Assignee: MacLean-Fogg Company, Mundelein, IL (US)

( * ) Notice: Subject to any disclaimer, the term of this patent is extended or adjusted under 35 U.S.C. 154(b) by 0 days.

(21) Appl. No.: 11/147,724

(22) Filed: Jun. 8, 2005

(65) Prior Publication Data

US 2005/0286988 A1      Dec. 29, 2005

Related U.S. Application Data

(63) Continuation-in-part of application No. 10/712,611, filed on Nov. 13, 2004, now abandoned, which is a continuation-in-part of application No. 09/933,312, filed on Aug. 20, 2001, now Pat. No. 6,749,386.

(51) Int. Cl.
*F16B 39/04* (2006.01)

(52) U.S. Cl. .................................. 411/150; 411/161

(58) Field of Classification Search ............... 411/147, 411/149, 150, 154, 160, 161, 11, 544
See application file for complete search history.

(56) References Cited

U.S. PATENT DOCUMENTS

| | | | |
|---|---|---|---|
| 292,063 A | 1/1884 | Shailer | |
| 367,196 A | 7/1887 | Deblieux | |
| 738,217 A | 9/1903 | Love | |
| 752,628 A | 2/1904 | Miner | |
| 827,562 A | 7/1906 | Pollock et al. | |
| 889,593 A | 6/1908 | Fleischmann | |
| 948,326 A | 2/1910 | Hesse | |
| 1,015,059 A | 1/1912 | Morgan | |
| 1,040,215 A | 10/1912 | Kriner | |
| 1,066,761 A * | 7/1913 | Semon | 411/138 |
| 1,115,864 A * | 11/1914 | Raymond | 152/428 |
| 1,140,974 A | 5/1915 | Formby | |
| 1,297,845 A | 3/1919 | Hawrylasz | |
| 1,577,946 A * | 3/1926 | Boutwell | 411/143 |
| 1,622,581 A | 3/1927 | Gunkel | |
| 1,894,631 A * | 1/1933 | Owen | 411/144 |
| 1,929,116 A * | 10/1933 | Kirton | 411/144 |
| 1,952,305 A | 3/1934 | Beck | |
| 2,210,455 A | 8/1940 | Hosking | |
| 2,253,241 A | 8/1941 | MacDonald | |

(Continued)

FOREIGN PATENT DOCUMENTS

DE         298 15 492 U1     10/1998

(Continued)

OTHER PUBLICATIONS

NorthWest Short Line—"Bits of Knowledge for Sharing".*

Primary Examiner—Flemming Saether
(74) Attorney, Agent, or Firm—Dana Andrew Alden

(57) ABSTRACT

The present invention relates to a fastener assembly, comprising a nut provided with a plurality of threads, a torque transmitter shaped to transmit torque to the nut, and an annular surface that is undulating in shape, a washer provided with a clamp surface and a bearing surface that is undulating in shape and axially opposed to the annular surface on the nut, and a spring member located between the annular surface on the nut and the bearing surface on the washer.

12 Claims, 14 Drawing Sheets

U.S. PATENT DOCUMENTS

| | | | |
|---|---|---|---|
| 2,562,032 A | 7/1951 | Gutensohn | |
| 2,783,810 A | 3/1957 | Wrigley | |
| 3,417,802 A | 12/1968 | Oldenkott | |
| 3,693,685 A | 9/1972 | Onufer | |
| 3,851,690 A | 12/1974 | Wing et al. | |
| 3,894,349 A * | 7/1975 | Moreau | 37/457 |
| 3,942,570 A | 3/1976 | Bochman, Jr. et al. | |
| 4,339,179 A | 7/1982 | Dany | |
| 4,377,361 A | 3/1983 | Frieberg | |
| 4,571,133 A * | 2/1986 | Lindow | 411/11 |
| 4,708,555 A * | 11/1987 | Terry | 411/149 |
| 4,812,095 A | 3/1989 | Piacenti et al. | |
| 4,941,787 A | 7/1990 | Shaffer | |
| 4,969,788 A * | 11/1990 | Goiny | 411/428 |
| 5,141,374 A | 8/1992 | Olofsson | |
| 5,180,265 A * | 1/1993 | Wiese | 411/150 |
| 5,409,338 A | 4/1995 | McKinlay | |
| 5,626,449 A * | 5/1997 | McKinlay | 411/149 |
| 5,984,602 A | 11/1999 | Park | |
| 6,135,689 A | 10/2000 | Matsunami | |
| 6,598,435 B2 * | 7/2003 | Cowan et al. | 70/232 |
| 6,776,565 B2 | 8/2004 | Chang | |
| 2002/0039522 A1 | 4/2002 | Hartman et al. | |

FOREIGN PATENT DOCUMENTS

| | | |
|---|---|---|
| DE | 199 56 287 A1 | 5/2001 |

* cited by examiner

LOCKING FASTENER ASSEMBLY

This is a continuation-in-part of application Ser. No. 10/712,611, filed Nov. 13, 2004 now abandoned, which is a continuation-in-part of application Ser. No. 09/933,312, filed on Aug. 20, 2001, now U.S. Pat. No. 6,749,386, the disclosures of application Ser. No. 10/712,611 and U.S. Pat. No. 6,749,386 are hereby incorporated herein by reference.

FIELD OF THE INVENTION

This invention relates to fastener assemblies, and particularly to locking fastener assemblies provided with an undulating surface.

BACKGROUND OF THE INVENTION

Fasteners are known in the art and are used for threading onto a threaded member. The present invention is an improved locking fastener that is provided with an undulating surface.

SUMMARY OF THE INVENTION

The scope of the present invention is defined solely by the appended claims, and is not affected to any degree by the statements within this summary. Briefly stated, a fastener assembly, comprising a nut provided with a plurality of threads, a torque transmitter shaped to transmit torque to the nut, and an annular surface that is undulating in shape, a washer provided with a clamp surface and a bearing surface that is undulating in shape and axially opposed to the annular surface on the nut, and a spring member located between the annular surface on the nut and the bearing surface on the washer.

DETAILED DESCRIPTION OF THE PREFERRED EMBODIMENTS

Figure 2:
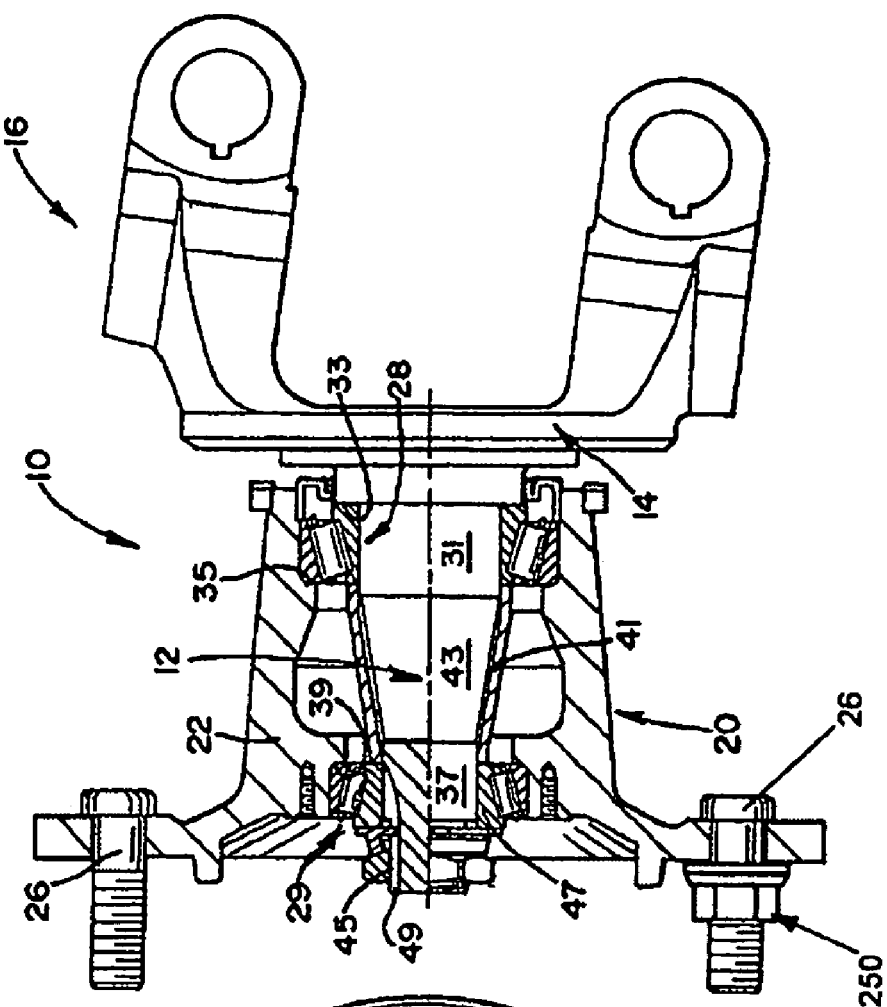
FIG. 2 is a sectional view taken along line 2-2 of FIG. 1.
Figure 1:
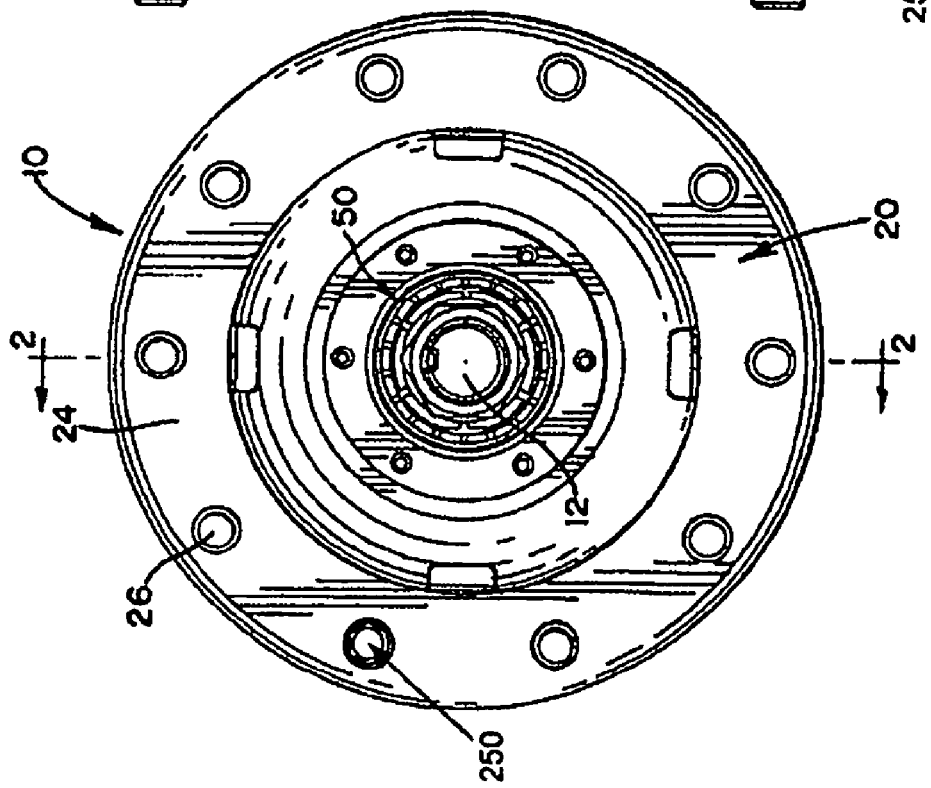
FIG. 1 is an end view of a vehicle axle and wheel hub having a fastener assembly of an alternative embodiment threaded onto a stud.

Referring now to FIGS. 1 and 2, yet another embodiment of the locking fastener assembly is depicted at 250. As shown, therein, the locking fastener assembly 250 is securing a wheel to a hub of a vehicle. The locking fastener assembly 250 includes three components, a nut 52, a washer 54, and spring member 256. The washer 54 is preferably fabricated from chromium molybderium alloy steel.

Figure 3:
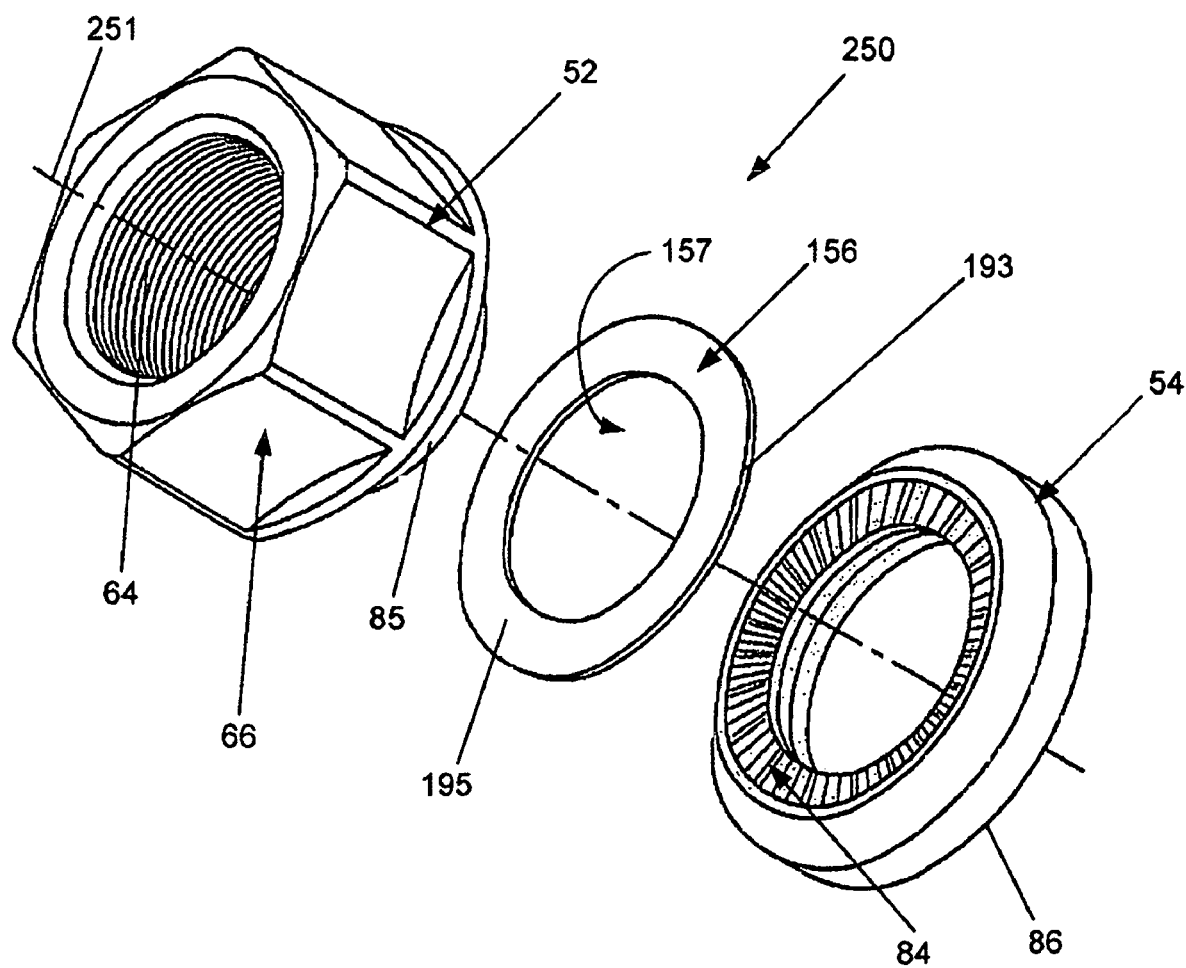
FIG. 3 is an exploded perspective view a locking fastener assembly of an alternative embodiment.
Figure 4:
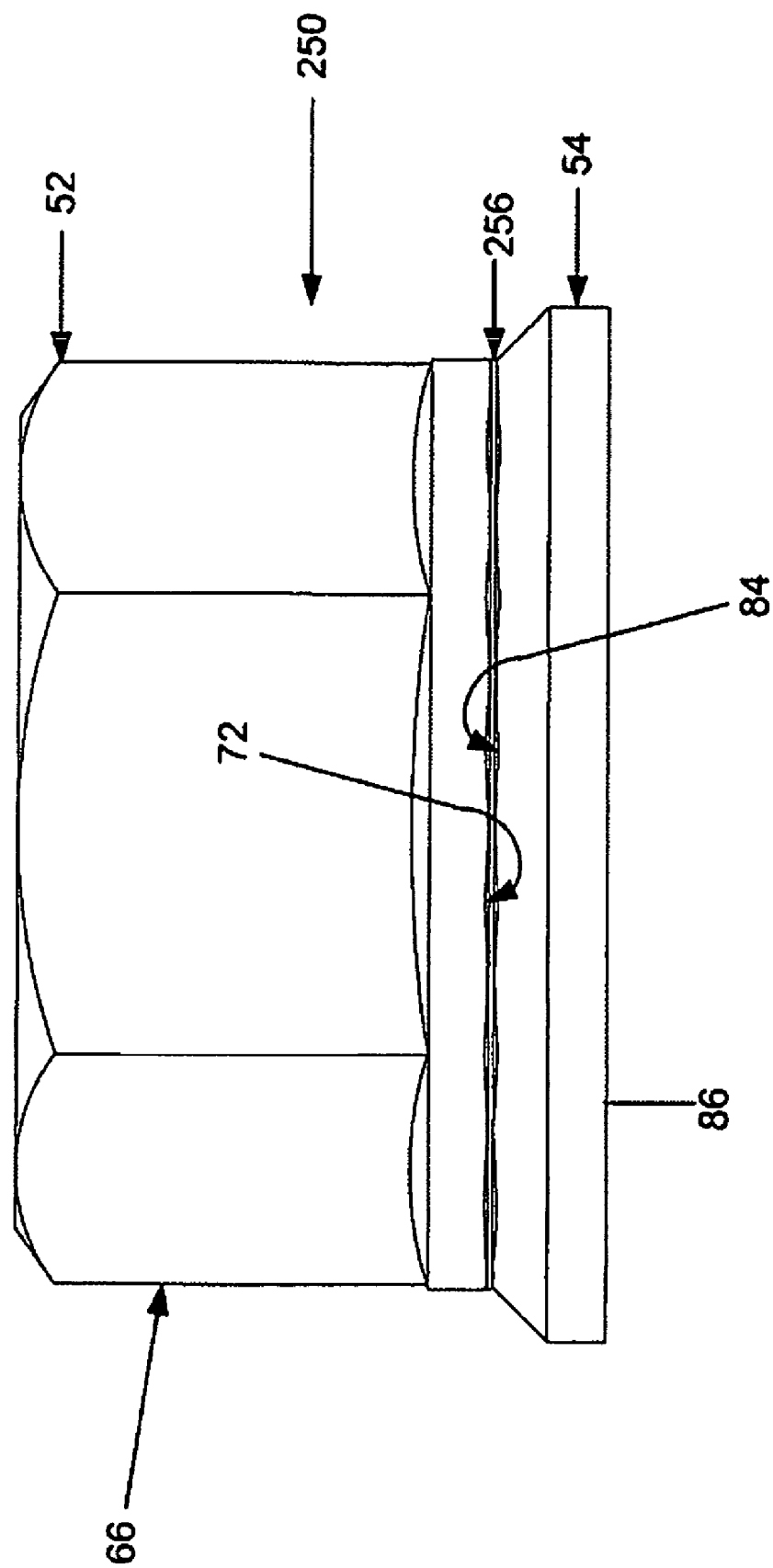
FIG. 4 is a side elevational view of a locking fastener assembly of an alternative embodiment.
Figure 5:
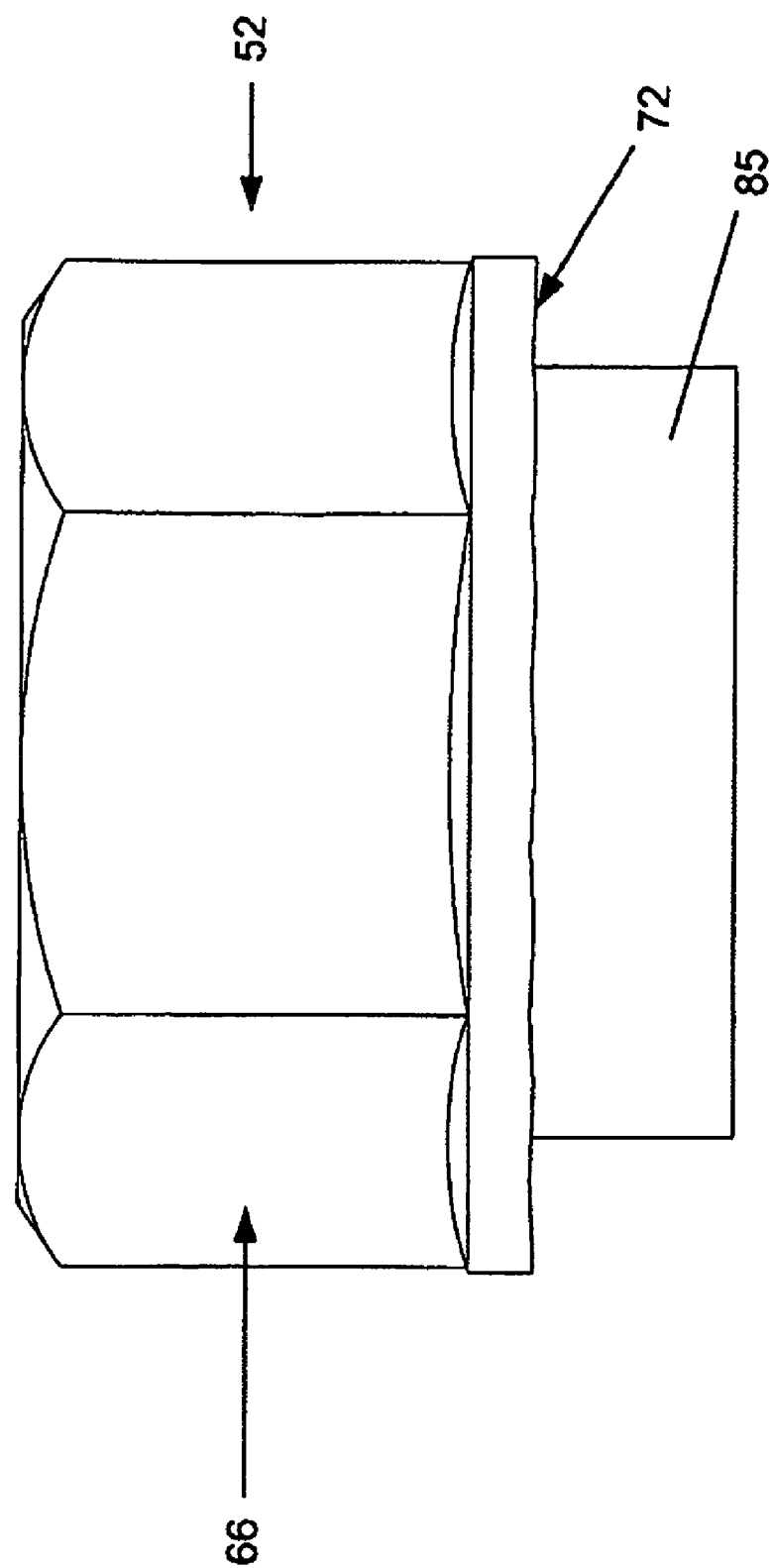
FIG. 5 is a side elevational view of a nut of an alternative embodiment.
Figure 6:
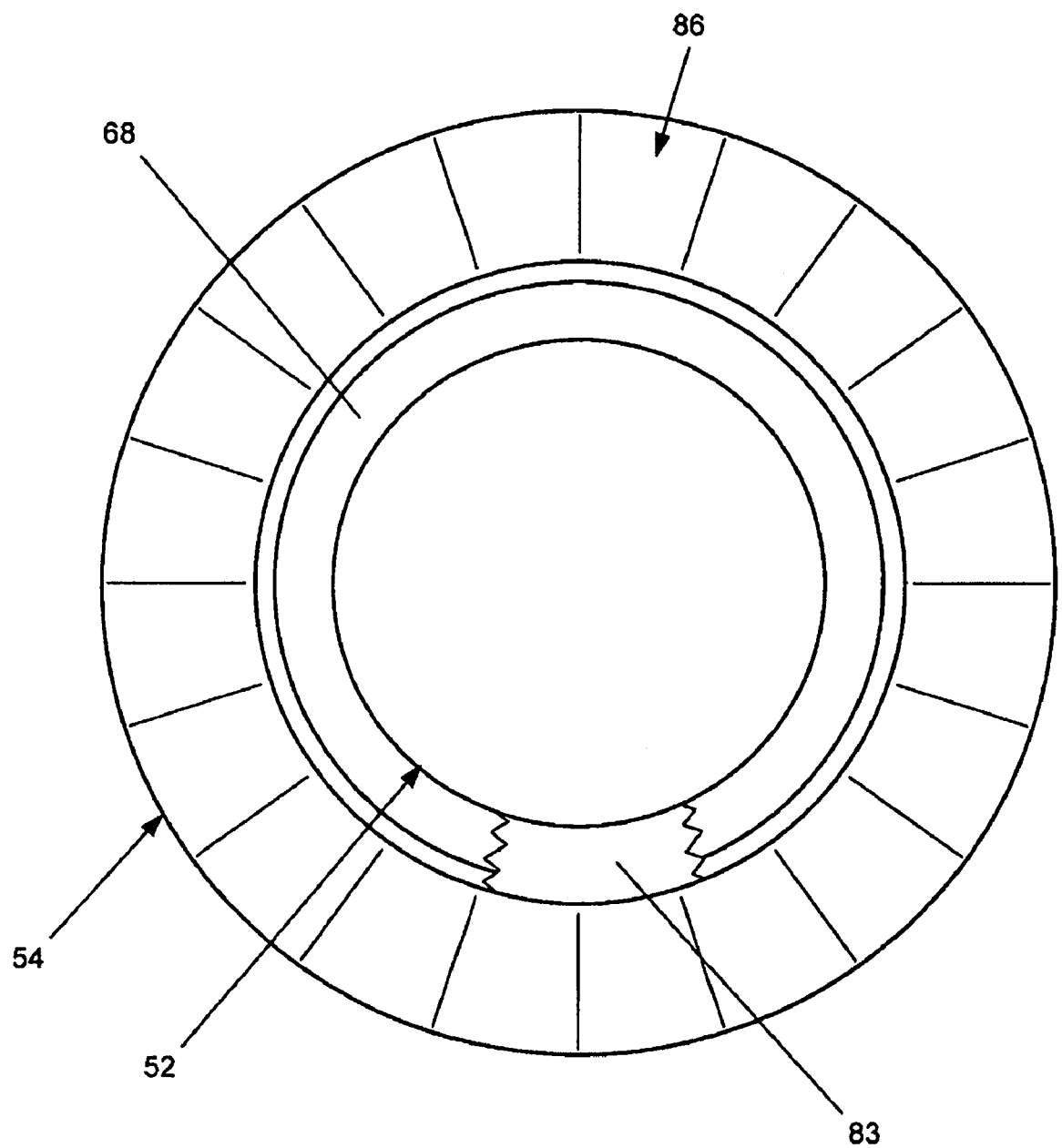
FIG. 6 is a top view of the clamping surface on the washer of an alternative embodiment
Figure 7:
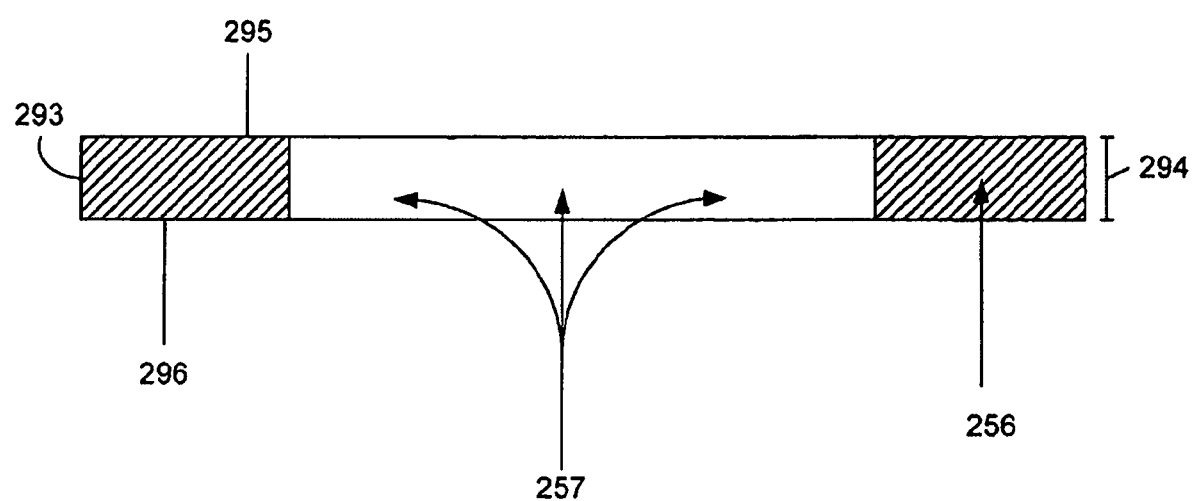
FIG. 7 is a side elevational view of a spring member, partially in section.

Turning now to FIGS. 3, 4 and 7, the spring member 256 of the present embodiment is depicted. The spring member is preferably fabricated from 1095 tempered spring steel that is provided with a Rockwell hardness of C 48-51; otherwise known as blue tempered spring steel. As shown in FIG. 7, the spring member 256 is generally annular in shape and defines a bore 257 that is dimensioned to receive the collar 85 of the nut 52. In this embodiment, the collar 85 on the nut 52 is adapted to extend axially into the bore 257 and within the generally cylindrical washer 82 whereupon a skirt 68 is formed by flaring the collar 85 outwardly under an undercut shoulder 83 within the washer 54.

Also shown in FIG. 7, the spring member 256 is provided with a nut contact surface 295 and a washer contact surface 296. The nut and washer contact surfaces 295, 296 are generally annular in shape and extend from the bore 257 to an intermediate surface 293 of the spring member 256. As shown therein, the intermediate surface 293 extends radially around the bore 257 and is located between the nut contact surface 290 and the washer contact surface 291. The intermediate surface 293 is provided with a thickness 294, which preferably measures approximately 0.81 mm.

According to one aspect of the present embodiment, the spring member 256 is configured to increase the ratio of generated clamp load to exerted torque: 1 Generated clamp load Exerted torque on the nut According to another aspect of the present embodiment, the spring member 256 is configured to reduce the exerted torque on the nut 52 when it is rotated relative to the washer 54. According to another aspect, the spring member 256 is configured to reduce the friction between the nut 52 and the washer 54 by a factor of 10. By way of example, and not limitation, the clamp load generated at 500 ft lbs of torque, without the spring member 256, is approximately 5,000 lbs, however, with the spring member 256 the clamp load is approximately 50,000 lbs.

According to one aspect of the present embodiment, the spring member 156 increases tension in the stud 26 as the nut is torqued. According to another aspect of the present embodiment, the spring member 156 increases the normal force that the threads 64 of the nut 52 exert on the threads of the stud 26 and the normal force that the threads of the stud 26 exert on the threads 64 on the nut 52. According to yet another aspect of the present embodiment, the spring member 156 increases the friction between the threads of the stud 26 and the threads 64 of the nut 52. According to another aspect of the present embodiment, the spring member 256 is configured to prevent the nut 52 from backing off the stud 26.

Figure 8A:
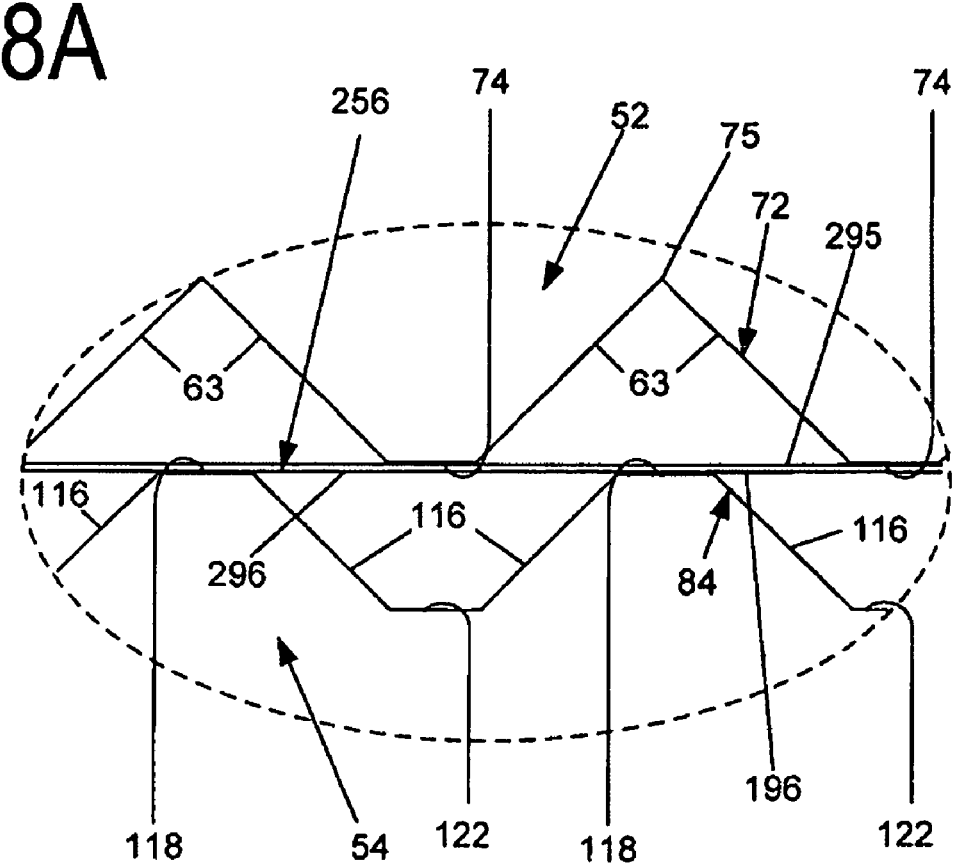
FIG. 8A is a close-up view of an annular surface on a nut, a bearing surface on a washer, and a spring member.
Figure 8B:
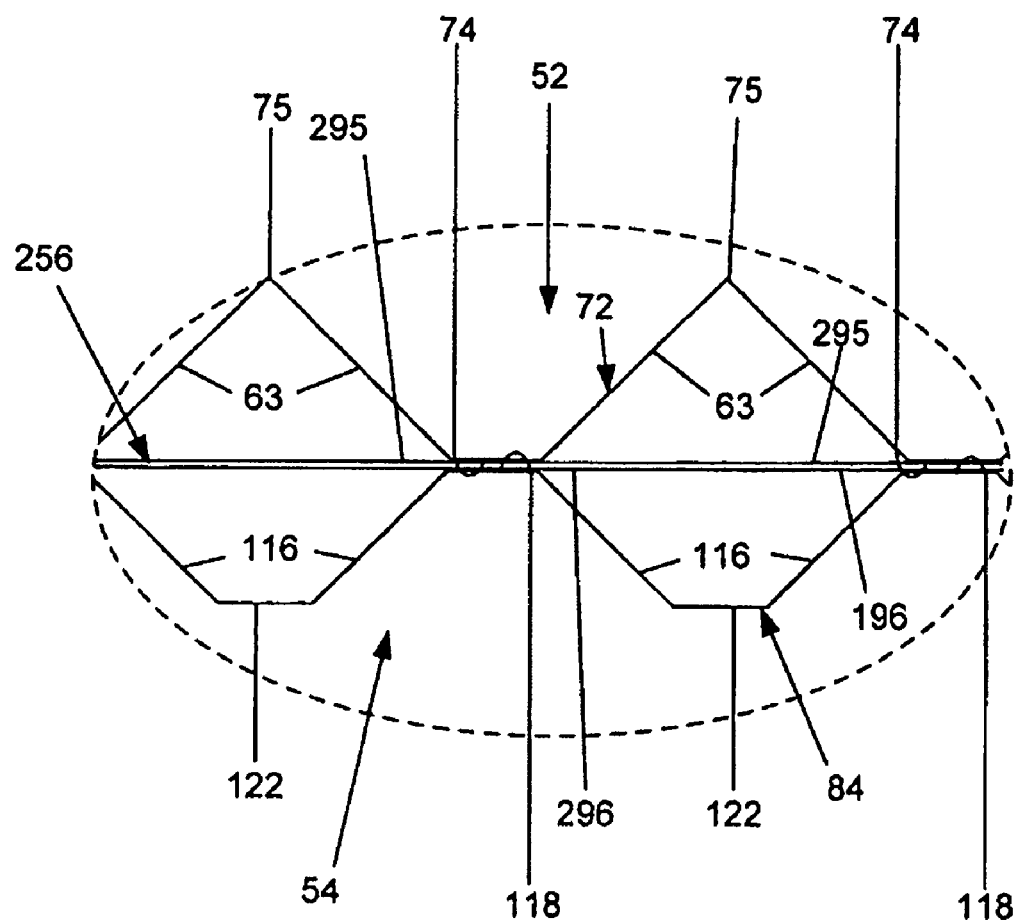
FIG. 8B is a close-up view of an annular surface on a nut, a bearing surface on a bearing surface on a washer, and a spring member.

When the nut 52 is threaded onto the stud 26, the washer 54 and spring member 256 are pushed freely in front of it. As rotation of the nut 52, with respect to the stud 26, continues, eventually, the peaks 74 on the nut 52 begin to exert a load on the nut contact surface 295 of the spring member 256. In this state, as shown in FIGS. 8A and 8B, the spring member 256 is seated upon the bearing surface 284 of the washer 54, whereby contact occurs between the washer contact surface 296 of the spring member 256 and the peaks 118 of the bearing surface 284. Additionally, as shown therein, the nut 52 is seated on the spring member 256, whereby contact occurs between the nut contact surface 295 of the spring member 256 and the peaks 74 of the bearing surface 72 of the nut 52. Furthermore, the nut and washer contact surfaces 295, 296 are substantially flat and substantially perpendicular with respect to the axis 251 of the assembly 250.

As rotation of the nut 52 continues, the peaks 74 on the nut 52 slide over the nut contact surface 295 of the spring member 256. Eventually, however, as further rotation of the nut 52 continues, the load exerted by the peaks 74 deflects the spring member 256. FIGS. 9A-E depicts the shape of the spring member 256 as the nut 52 is progressively rotated in the direction of arrow A. As shown therein, when the peaks 74 on the nut 52 are located between adjacent peaks 118, such as peaks 118a and 118b, on the washer 54, the spring member 256 is deflected and provided with peaks 297, inclined faces 298, and valleys 299. The peaks 297 of the spring member 256 are seated on the peaks 118 of the washer 54 and the peaks 74 of the nut 52 are seated on the valleys 299 of the spring member 256. The inclined faces 298 of the spring member 256 are preferably angled radially and circumferentially. Also shown in FIGS. 9A-E, when the peaks 74 on the nut 52 are positioned axially above the peaks 118 of the washer 54, the spring member 256 resiliently returns to a relatively flattened shape and is preferably provided with substantially flat nut and washer contact surfaces 295, 296.

Figure 9A:
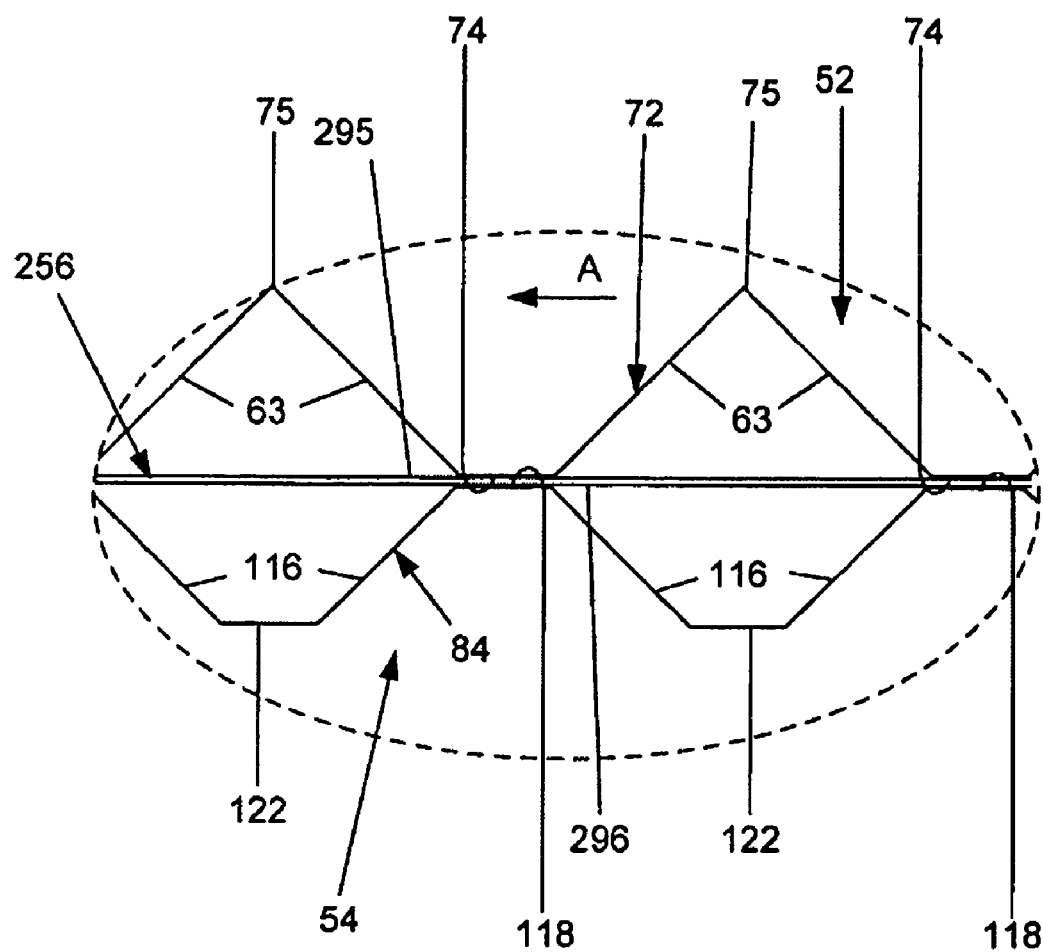
FIG. 9A is a close-up view of an annular surface on a nut, a bearing surface on a washer, and a spring member.
Figure 9B:
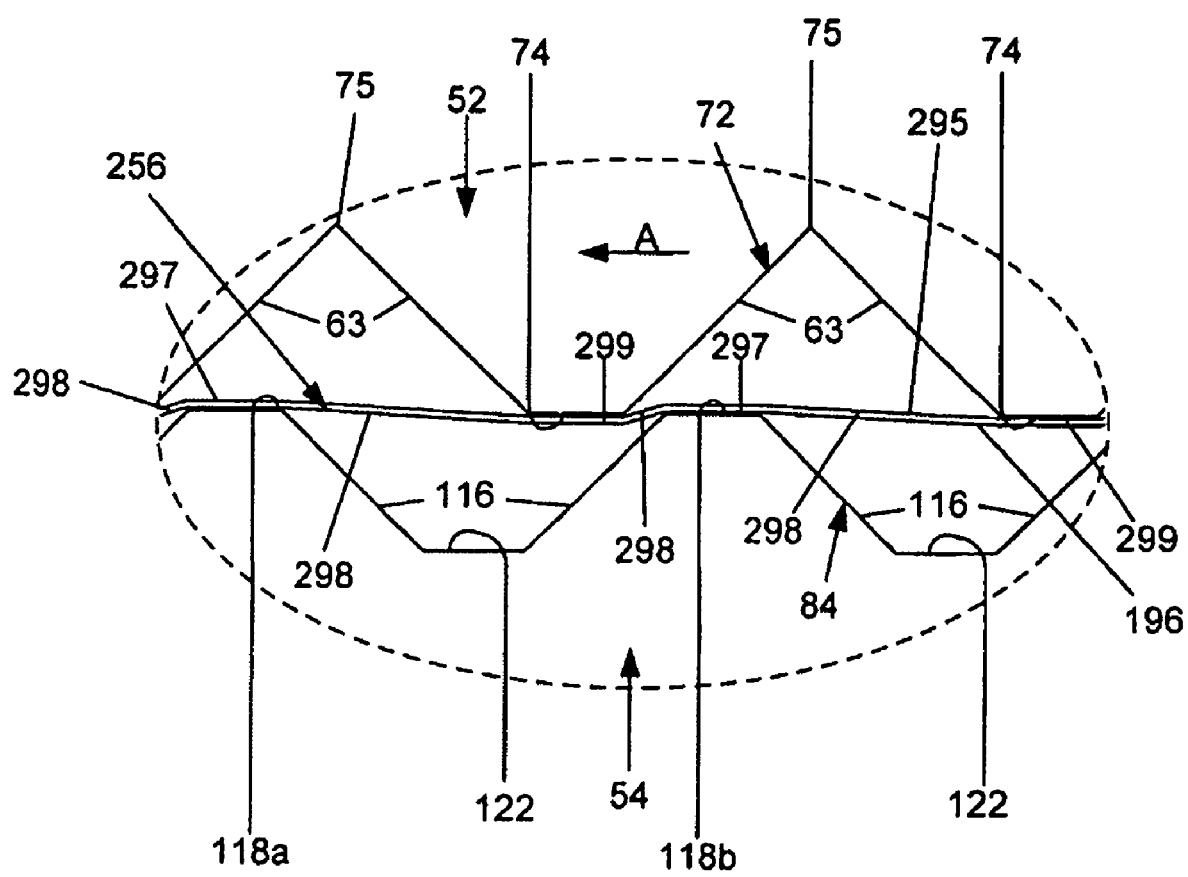
FIG. 9B is a close-up view of an annular surface on a nut, a bearing surface on a washer, and a spring member.
Figure 9C:
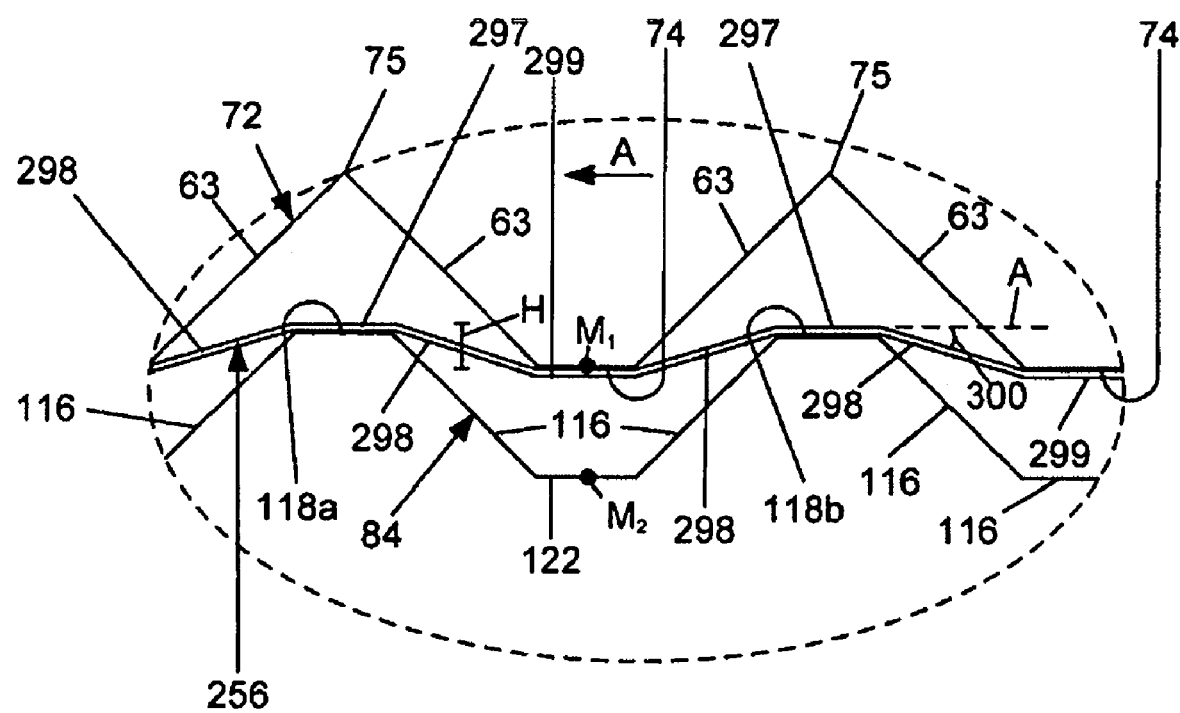
FIG. 9C is a close-up view of an annular surface on a nut, a bearing surface on a washer, and a spring member.
Figure 9D:
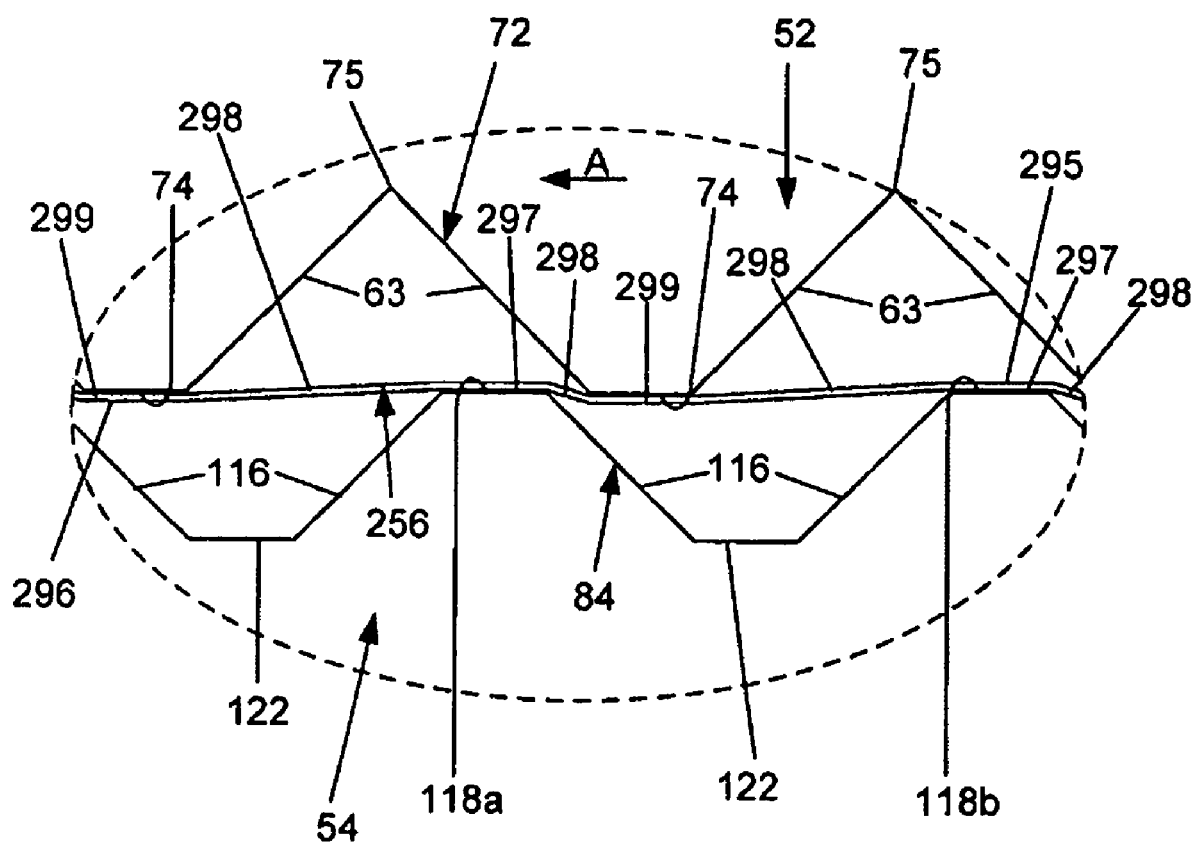
FIG. 9D is a close-up view of an annular surface on a nut, a bearing surface on a washer, and a spring member.
Figure 9E:
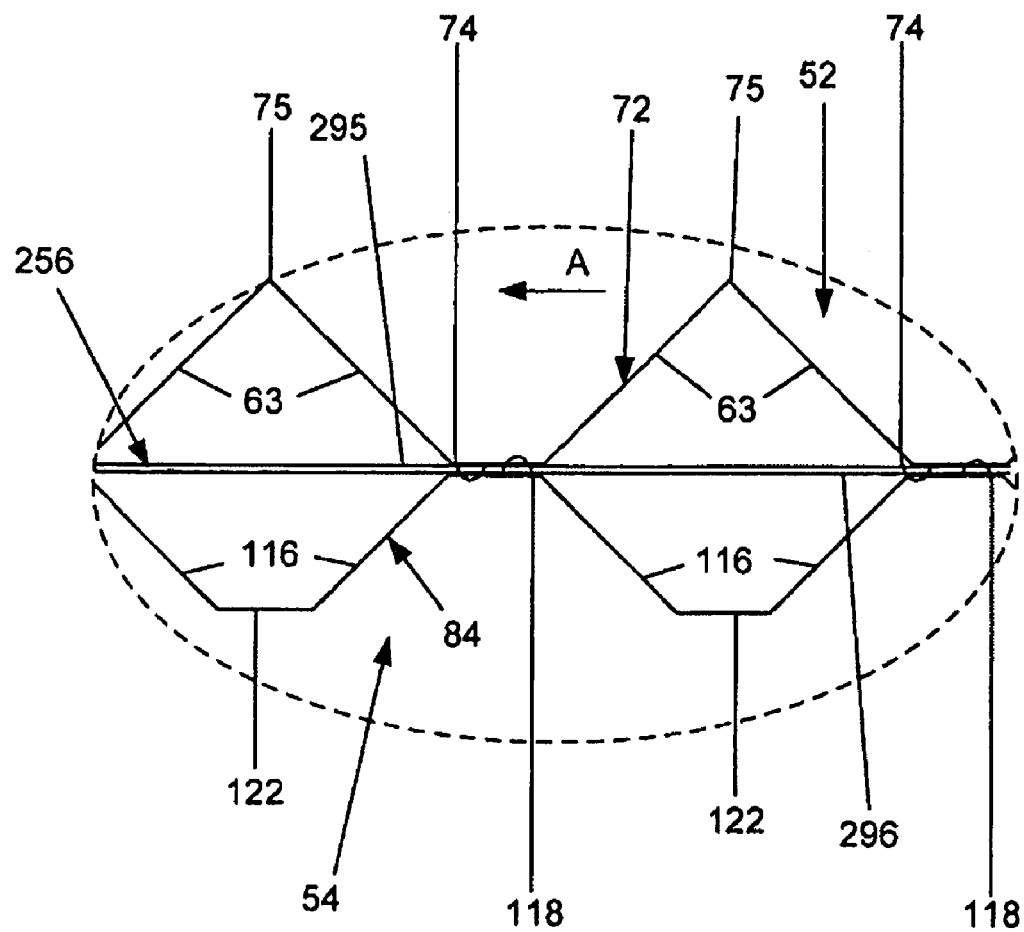
FIG. 9E is a close-up view of an annular surface on a nut, a bearing surface on a washer, and a spring member.

According to one aspect of the present embodiment, the extent of deflection is measured by the deflection angle 300 of the faces 298 on the spring member 256. As shown in FIG. 9C, the deflection angle 300 is measured with respect to a line A, which extends in a direction that is perpendicular to the axis 251 of the locking fastener assembly 250. As shown in FIGS. 9C-9E, the deflection angle 300 decreases as the peaks 74 on the nut 52 move away from the midpoints M.sub.2 of the valleys 122 and towards the peaks 118 on the washer 54.

According to another aspect of the present embodiment, the extent of the deflection of the spring member 256 is measured by the vertical height H of the peaks 297 on the spring member 256 above the valleys 299 of the spring member 256. The vertical height H increases to a maximum when the midpoints M.sub.1 of the peaks 74 on the nut 52 are positioned substantially above the midpoints M.sub.2 of the valleys 122 on the washer 54, as shown in FIG. 9C. The maximum vertical height is dimensioned to be greater than the clearance between the threads 264 in the nut 52 and those on the stud 26. In the preferred embodiment, the maximum vertical height measures approximately 0.15 mm. The vertical height H decreases to a minimum, when the peaks 74 on the nut 52 are positioned axially above of the peaks 118 on the washer 54, as shown in FIGS. 9A and 9E.

According to one aspect of the present embodiment, there is an increase in the normal force exerted on the threads of the stud 26 by the threads 64 on the nut 52, when there is a decrease in the deflection angle 300 of the faces 298 on the spring member 256. According to another aspect of the present embodiment, when the vertical height H transitions from the maximum to the minimum, there is an increase in the normal force exerted on the threads of the stud 26 by the threads 64 on the nut 52. As a result, there is an increase in the tension in the stud 26 and an increase in friction between the threads on the stud 26 and threads 64 on the nut 52. As friction increases between the threads on the stud 26 and the threads 64 on the nut, the amount of torque required to rotate the nut 52 increases. Thus, once the nut 52 is secured onto the stud 26, the fastener assembly 250 can be relied upon to resist rotational forces tending to cause the nut 52 to back off the stud 26.

Figure 10:
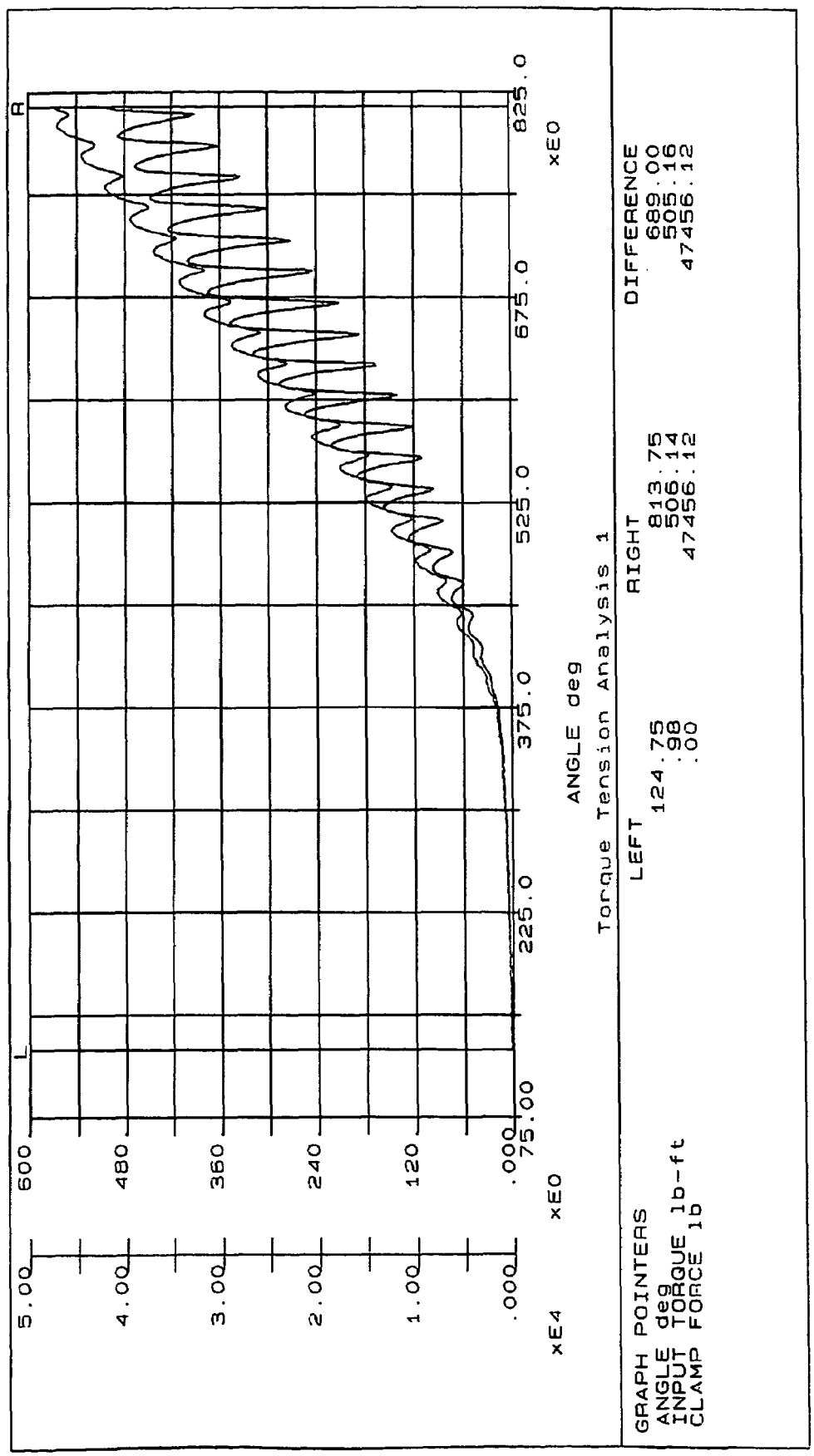
FIG. 10 is a graphical illustration depicting pounds of force generated per degree of rotation of the nut and pounds of torque exerted on the nut per degree of rotation of the nut.

FIG. 10 depicts a graphical illustration showing a torque tension analysis of the fastener assembly 250. In FIG. 10, line L1 represents the correlation between the amount of clamp load exerted on the substrate or tension exerted on the stud 26 per degree of rotation of the nut 52. Line L2 represents the pounds of torque exerted on the nut 52 per degree of rotation of the nut 52. As shown by line L1, when the nut 52 is secured onto the stud 26, tension in the stud 26 can only be reduced by first increasing tension in the stud 26. Only by applying sufficiently large loosening torque to the nut 52 can the locking assembly 250 be removed.

Although this invention has been described in the preferred context of a vehicle wheel hub mounting arrangement and a vehicle wheel mounting arrangement, it should be understood that it might be otherwise employed and that modifications may be made without departing from the invention. The scope of the invention is defined by the appended claims, and all devices that come within the meaning of the claims, either literally or by equivalence, are intended to be embraced therein.

What is claimed is:

1. A fastener assembly, comprising:
   a) a nut provided with:
      i) a plurality of threads;
      ii) a torque transmitter shaped to transmit torque to the nut;
      iii) an annular surface that is provided with a plurality of peaks, faces, and valleys;
   b) a washer provided with:
      i) a clamping surface;
      ii) a bearing surface that is axially opposed to the annular surface on the nut and provided with a plurality of peaks, and valleys; and
   c) a spring member located between the annular surface on the nut and the bearing surface on the washer, wherein at least a portion of at least one of the annular surface on the nut or the bearing surface on the washer deflects the spring member whereby the spring member is undulating in shape.

2. A fastener assembly according to claim 1, further comprising:
   a) a bore defined by the spring member; and
   b) a collar located on the nut that extends within the bore and within the washer, wherein at least a portion of the collar is flared outwardly to secure the washer and the spring member to the nut.

3. A fastener assembly according to claim 1, wherein the clamping surface on the washer is substantially flat.

4. A fastener assembly according to claim 1, wherein the spring member is provided with a nut contact surface that contacts the peaks on the nut and a washer contact surface that contacts the peaks on the washer.

5. A fastener assembly according to claim 1, wherein the spring member is configured to increase the ratio of generated clamp load to exerted torque.

6. A fastener assembly according to claim 1, wherein the peaks on at least one of the annular surfaces and the bearing surface are generally convex and lie on the surface of an imaginary sphere that is provided with a radius that is dimensioned.

7. A fastener assembly according to claim 1, wherein the spring member is provided with a thickness that measures approximately 0.81 mm.

8. A fastener assembly according to claim 1, wherein at least a portion of at least one of the annular surface on the nut or the bearing surface on the washer deflects the spring member whereby the spring member is provided with a plurality of peaks, faces, and valleys.

9. A fastener assembly according to claim 1, wherein:
  a) at least a portion of the annular surface on the nut or the bearing surface on the washer deflects the spring member whereby the spring member is provided with a plurality of peaks, faces, and valleys; and
  b) an axial height extends axially between the valleys and peaks on the spring member, wherein the axial height is dimensioned.

10. A fastener assembly according to claim 1, further comprising:
  a) at least a portion of the annular surface on the nut or the bearing surface on the washer deflects the spring member whereby the spring member is provided with a plurality of peaks, faces, and valleys;
  b) the faces on the spring member are provided with a deflection angle; and
  c) friction between the threads on the nut and a plurality of threads on a stud increases as the deflection angle decreases.

11. A fastener assembly according to claim 1, wherein an axial height that extends axially between the valleys and peaks on at least one of the nut or washer is dimensioned.

12. A fastener assembly according to claim 1, wherein:
  a) at least a portion of the annular surface on the nut or the bearing surface on the washer deflects the spring member whereby the spring member is provided with a plurality of peaks, faces, and valleys;
  b) the peaks on the spring member are provided with a height that corresponds to an axial distance between the peaks and the valleys on the spring member; and
  c) friction between the threads on the nut and a plurality of threads on a stud increases as the height decreases.

* * * * *